(12) United States Patent
Schrooten et al.

(10) Patent No.: US 8,790,842 B2
(45) Date of Patent: Jul. 29, 2014

(54) FUEL CELL SYSTEMS INCLUDING SPACE-SAVING FLUID PLENUM AND RELATED METHODS

(75) Inventors: Jeremy Schrooten, Mission (CA); Paul Sobejko, North Vancouver (CA); Gerard F McLean, West Vancouver (CA)

(73) Assignee: Societe BIC, Clichy (FR)

( * ) Notice: Subject to any disclaimer, the term of this patent is extended or adjusted under 35 U.S.C. 154(b) by 727 days.

(21) Appl. No.: 12/238,241

(22) Filed: Sep. 25, 2008

(65) Prior Publication Data
US 2009/0081493 A1 Mar. 26, 2009

Related U.S. Application Data

(60) Provisional application No. 60/975,129, filed on Sep. 25, 2007, provisional application No. 60/975,132, filed on Sep. 25, 2007.

(51) Int. Cl.
*H01M 8/04* (2006.01)
(52) U.S. Cl.
USPC ............................ 429/513; 429/490; 429/509
(58) Field of Classification Search
CPC ............ H01M 8/0271; H01M 8/0273; H01M 8/04089; H01M 8/04201; H01M 8/2485; Y02E 60/50
USPC ......... 429/443, 444, 507, 508, 509, 512, 513, 429/127, 490
IPC ....................................................... H01M 8/04
See application file for complete search history.

(56) References Cited

U.S. PATENT DOCUMENTS

| | | | |
|---|---|---|---|
| 3,402,230 A | 9/1968 | White, Jr. | |
| 5,160,627 A | 11/1992 | Cussler et al. | |
| 5,171,646 A | 12/1992 | Rohr | |
| 5,190,834 A | 3/1993 | Kendall | |
| 5,310,765 A | 5/1994 | Banerjee et al. | |
| 5,364,711 A | 11/1994 | Yamada et al. | |
| 5,432,023 A | 7/1995 | Yamada et al. | |
| 5,468,574 A | 11/1995 | Ehrenberg et al. | |

(Continued)

FOREIGN PATENT DOCUMENTS

| | | |
|---|---|---|
| CA | 2408587 A1 | 12/2001 |
| CA | 2408588 A1 | 12/2001 |

(Continued)

OTHER PUBLICATIONS

"U.S. Appl. No. 11/047,558, Final Office Action mailed Jun. 16, 2006", 15 pgs.

(Continued)

*Primary Examiner* — Basia Ridley
*Assistant Examiner* — Heng Chan
(74) *Attorney, Agent, or Firm* — Schwegman Lundberg & Woessner, P.A.

(57) ABSTRACT

Fuel cell systems and methods having reduced volumetric requirements are described. The systems include, among other things, an enclosed region formed by the bonding of a fuel cell layer with a fluid manifold. The enclosed region transforms into a fluid plenum when, for example, a fluid exiting a manifold outlet pressurizes the enclosed region causing one or more portions of the fuel cell layer and/or the fluid manifold to deform away from each other.

31 Claims, 6 Drawing Sheets

(56) References Cited

U.S. PATENT DOCUMENTS

| | | | |
|---|---|---|---|
| 5,547,551 | A | 8/1996 | Bahar et al. |
| 5,587,253 | A | 12/1996 | Gozdz et al. |
| 5,599,614 | A | 2/1997 | Bahar et al. |
| 5,635,041 | A | 6/1997 | Bahar et al. |
| 5,679,482 | A | 10/1997 | Ehrenberg et al. |
| 5,709,961 | A | 1/1998 | Cisar et al. |
| 5,783,324 | A | 7/1998 | Binder et al. |
| 5,853,916 | A | 12/1998 | Venugopal et al. |
| 5,861,221 | A | 1/1999 | Ledjeff et al. |
| 5,863,672 | A | 1/1999 | Ledjeff et al. |
| 5,925,477 | A | 7/1999 | Ledjeff et al. |
| 5,952,118 | A | 9/1999 | Ledjeff et al. |
| 5,989,741 | A | 11/1999 | Bloomfield et al. |
| 6,127,058 | A | 10/2000 | Pratt et al. |
| 6,131,851 | A | 10/2000 | Williams |
| 6,544,400 | B2 * | 4/2003 | Hockaday et al. .......... 205/338 |
| 6,551,745 | B2 | 4/2003 | Moutsios et al. |
| 6,579,643 | B1 | 6/2003 | Gozdz |
| 6,582,847 | B1 | 6/2003 | Bruck et al. |
| 6,613,203 | B1 | 9/2003 | Hobson et al. |
| 6,641,862 | B1 | 11/2003 | Grot |
| 6,680,139 | B2 | 1/2004 | Narayanan et al. |
| 6,815,121 | B2 | 11/2004 | Dasgupta et al. |
| 6,933,077 | B2 | 8/2005 | Sudano et al. |
| 7,078,361 | B2 | 7/2006 | Cisar et al. |
| 7,117,732 | B2 | 10/2006 | Curello et al. |
| 7,118,826 | B2 | 10/2006 | O'Neil et al. |
| 7,153,601 | B2 | 12/2006 | Mardilovich et al. |
| 7,223,491 | B2 | 5/2007 | McLean et al. |
| 7,226,646 | B2 | 6/2007 | McLean et al. |
| 7,229,564 | B2 | 6/2007 | Liu et al. |
| 7,314,677 | B2 | 1/2008 | Mosdale |
| 7,323,266 | B2 | 1/2008 | Morishima et al. |
| 7,341,800 | B2 | 3/2008 | Sasahara et al. |
| 7,378,176 | B2 | 5/2008 | McLean et al. |
| 7,410,720 | B2 | 8/2008 | Yoshitake et al. |
| 7,604,887 | B2 | 10/2009 | Mino et al. |
| 7,632,587 | B2 | 12/2009 | McLean et al. |
| RE41,163 | E | 3/2010 | Ngo et al. |
| 7,858,261 | B2 | 12/2010 | Schaevitz et al. |
| 7,858,262 | B2 | 12/2010 | Faucheux et al. |
| 8,232,025 | B2 | 7/2012 | McLean et al. |
| 8,551,637 | B2 | 10/2013 | McLean et al. |
| 2003/0049516 | A1 | 3/2003 | Twu et al. |
| 2003/0077496 | A1 | 4/2003 | Keegan et al. |
| 2003/0082425 | A1 | 5/2003 | Leban |
| 2003/0104273 | A1 | 6/2003 | Lee et al. |
| 2003/0152817 | A1 | 8/2003 | Sato et al. |
| 2003/0162076 | A1 | 8/2003 | Kubota |
| 2003/0175569 | A1 | 9/2003 | Inagaki et al. |
| 2003/0194598 | A1 | 10/2003 | Chan |
| 2003/0215719 | A1 | 11/2003 | Navarrini et al. |
| 2004/0062965 | A1 | 4/2004 | Morse et al. |
| 2004/0071865 | A1 | 4/2004 | Mosdale et al. |
| 2004/0081878 | A1 | 4/2004 | Mardilovich et al. |
| 2004/0175626 | A1 | 9/2004 | Dasgupta et al. |
| 2004/0209136 | A1 | 10/2004 | Ren et al. |
| 2004/0224190 | A1 * | 11/2004 | Sasahara et al. ............... 429/12 |
| 2005/0249994 | A1 | 11/2005 | McLean et al. |
| 2005/0250004 | A1 | 11/2005 | McLean et al. |
| 2005/0260478 | A1 | 11/2005 | Mino et al. |
| 2006/0127734 | A1 | 6/2006 | McLean et al. |
| 2007/0090786 | A1 | 4/2007 | McLean |
| 2007/0134531 | A1 | 6/2007 | Kimura et al. |
| 2007/0166590 | A1 | 7/2007 | Nakano et al. |
| 2007/0184330 | A1 | 8/2007 | McLean et al. |
| 2008/0220210 | A1 | 9/2008 | McLean et al. |
| 2008/0233446 | A1 | 9/2008 | Zimmermann et al. |
| 2008/0233454 | A1 | 9/2008 | Capron et al. |
| 2008/0248352 | A1 | 10/2008 | McLean et al. |
| 2010/0183955 | A1 | 7/2010 | McLean et al. |
| 2011/0003229 | A1 | 1/2011 | Schrooten |
| 2012/0270132 | A1 | 10/2012 | McLean et al. |

FOREIGN PATENT DOCUMENTS

| | | |
|---|---|---|
| CA | 2408538 A1 | 11/2002 |
| CA | 2473491 A1 | 8/2003 |
| CA | 2479000 A1 | 9/2003 |
| CA | 2446121 A1 | 4/2004 |
| CN | 1461070 A | 12/2003 |
| CN | 102208664 B | 8/2013 |
| EP | 0763070 B1 | 3/1997 |
| EP | 1202365 A1 | 5/2002 |
| EP | 1294039 A1 | 3/2003 |
| EP | 1345280 A1 | 9/2003 |
| GB | 1091303 A | 11/1967 |
| HK | 1102014 | 1/2012 |
| JP | 2001-514431 A | 9/2001 |
| JP | 2003-123792 A | 4/2003 |
| JP | 2005190752 A | 7/2005 |
| JP | 2006-127852 A | 5/2006 |
| JP | 2008-041371 A | 2/2008 |
| JP | 2008108465 A | 5/2008 |
| JP | 2008544473 A | 12/2008 |
| KR | 10-2004-0033038 | 4/2004 |
| KR | 20100060008 A | 6/2010 |
| WO | WO-9532236 | 11/1995 |
| WO | WO-97/41168 A1 | 11/1997 |
| WO | WO-99/10165 A1 | 3/1999 |
| WO | WO-99/67447 A1 | 12/1999 |
| WO | WO-0174710 | 10/2001 |
| WO | WO-2004/019439 A1 | 3/2004 |
| WO | WO-2007000593 | 1/2007 |
| WO | WO-2007/020242 A1 | 2/2007 |
| WO | WO-2007/079580 A1 | 7/2007 |
| WO | WO-2007110956 A1 | 10/2007 |
| WO | WO-2009/039656 A1 | 4/2009 |
| WO | WO-2009/105896 A1 | 9/2009 |

OTHER PUBLICATIONS

"U.S. Appl. No. 11/047,558, Interview Summary dated Oct. 17, 2006", 2 pgs.

"U.S. Appl. No. 11/047,558, Non-Final Office Action mailed Jan. 22, 2007", 6 pgs.

"U.S. Appl. No. 11/047,558, Non-Final Office Action mailed Nov. 28, 2005", 14 pgs.

"U.S. Appl. No. 11/047,558, Notice of Allowance mailed Jan. 24, 2008", 4 pgs.

"U.S. Appl. No. 11/047,558, Notice of Allowance mailed Oct. 3, 2007", 3 pgs.

"U.S. Appl. No. 11/047,558, Notice of Non-Compliant Amendment mailed Jun. 28, 2007", 2 pgs.

"U.S. Appl. No. 11/047,558, Response filed Mar. 28, 2006 to Non-Final Office Action mailed Nov. 28, 2005", 12 pgs.

"U.S. Appl. No. 11/047,558, Response filed Apr. 20, 2007 to Non-Final Office Action mailed Jan. 22, 2007", 11 pgs.

"U.S. Appl. No. 11/047,558, Response filed Jul. 27, 2007 to Non-Final Office Action mailed Jan. 22, 2007", 11 pgs.

"U.S. Appl. No. 11/047,558, Response filed Sep. 20, 2005 to Restriction Requirement mailed Aug. 23, 2005", 1 pg.

"U.S. Appl. No. 11/047,558, Response filed Nov. 15, 2006 to Final Office Action mailed Jun. 16, 2006", 14 pgs.

"U.S. Appl. No. 11/047,558, Restriction Requirement mailed Aug. 23, 2005", 6 pgs.

"U.S. Appl. No. 11/047,560, Non-Final Office Action mailed Dec. 24, 2008", 12 pgs.

"U.S. Appl. No. 11/047,560, Amendment and Response filed Mar. 2, 2007 to Non-Final Office Action mailed Nov. 2, 2006", 15 pgs.

"U.S. Appl. No. 11/047,560, Internview Summary mailed Feb. 23, 2007", 2 pgs.

"U.S. Appl. No. 11/047,560, Internview Summary mailed Oct. 17, 2006", 2 pgs.

"U.S. Appl. No. 11/047,560, Non-Final Office Action mailed May 3, 2006", 12 pgs.

"U.S. Appl. No. 11/047,560, Non-Final Office Action mailed Jun. 15, 2007", 12 pgs.

"U.S. Appl. No. 11/047,560, Non-Final Office Action mailed Nov. 2, 2006", 15 pgs.

(56) References Cited

OTHER PUBLICATIONS

"U.S. Appl. No. 11/047,560, Notice of Allowance mailed Jul. 28, 2009", 4 pgs.
"U.S. Appl. No. 11/047,560, Notice of Allowance mailed Sep. 26, 2008", 4 pgs.
"U.S. Appl. No. 11/047,560, Response filed Feb. 8, 2006 to Restriction Requirement mailed Jan. 9, 2006", 2 pgs.
"U.S. Appl. No. 11/047,560, Response filed Mar. 24, 2009 to Non Final Office Action mailed Dec. 24, 2008", 11 pgs.
"U.S. Appl. No. 11/047,560, Response filed Aug. 3, 2006 to Non-Final Office Action mailed May 3, 2006", 15 pgs.
"U.S. Appl. No. 11/047,560, Response filed Sep. 17, 2007 to Non-Final Action mailed Jun. 15, 2007", 6 pgs.
"U.S. Appl. No. 11/047,560, Response filed Nov. 8, 2005 to Restriction Requirement mailed Aug. 23, 2005", 2 pgs.
"U.S. Appl. No. 11/047,560, Restriction Requirement mailed Jan. 9, 2006", 5 pgs.
"U.S. Appl. No. 11/047,560, Restriction Requirement mailed Aug. 23, 2005", 5 pgs.
"U.S. Appl. No. 11/290,646, Non-Final Office Action mailed Jun. 15, 2006", 13 pgs.
"U.S. Appl. No. 11/290,646, Notice of Allowance mailed Feb. 22, 2007", 4 pgs.
"U.S. Appl. No. 11/290,646, Response filed Nov. 15, 2006 to Non-Final Office Action mailed Jun. 15, 2006", 8 pgs.
"U.S. Appl. No. 11/290,647, Non-Final Office mailed Jun. 15, 2006", 9 pgs.
"U.S. Appl. No. 11/290,647, Notice of Allowance Jan. 26, 2007", 4 pgs.
"U.S. Appl. No. 11/290,647, Response filed Nov. 15, 2006 to Non-Final Office mailed Jun. 15, 2006", 9 pgs.
"U.S. Appl. No. 12/126,811, Final Office Action mailed Aug. 3, 2011", 14 pgs.
"U.S. Appl. No. 12/126,811, Non Final Office Action mailed Dec. 23, 2010", 16 pgs.
"U.S. Appl. No. 12/126,811, Response filed May 16, 2011 to Non Final Office Action mailed Dec. 23, 2010", 13 pgs.
"U.S. Appl. No. 12/637,422, Non Final Office Action mailed Feb. 2, 2011", 9 pgs.
"U.S. Appl. No. 12/637,422, Response filed Aug. 2, 2011 to Non Final Office Action mailed Feb. 2, 2011", 12 pgs.
"Chinese Application Serial No. 200580018092.5, Response filed Apr. 15, 2009 to Office Action mailed Feb. 6, 2009", 8 pgs.
"Chinese Application Serial No. 200580018092.5, Response filed Nov. 4, 2009 to Third Office Action dated Jun. 19, 2009", (w/ English Translation of Amended Claims), 14 pgs.
"Chinese Application Serial No. 200580018092.5, Fourth Office Action mailed Dec. 4, 2009", (w/ English Translation), 21 pgs.
"Chinese Application Serial No. 200580018092.5, Response filed Apr. 14, 2010 to Fourth Office Action mailed Dec. 4, 2009", 7 pgs.
"Chinese Application Serial No. 200580018092.5, Second Office Action mailed Feb. 6, 2009", (w/ English Translation), 13 pgs.
"Chinese Application Serial No. 200580018092.5, Third Office Action dated Jun. 19, 2009", (w/ English Translation), 33 pgs.
"Chinese Application Serial No. 200580018178.8, Office Action mailed May 8, 2009", 8 pgs.
"Chinese Application Serial No. 200580018178.8, Response filed Oct. 15, 2010 to Office Action mailed Jun. 11, 2010", 6 pgs.
"Chinese Application Serial No. 200580018178.8, Response filed Nov. 23, 2009 to Office Action dated May 8, 2009", 7 pgs.
"Chinese Application Serial No. 200580018178.8, Second Office Action mailed Jun. 11, 2010", 10 pgs.
"European Application Serial No. 05741066.4, Office Action mailed Feb. 5, 2009", 4 pgs.
"European Application Serial No. 05741066.4, Response filed Jun. 12, 2009 to Communication dated Feb. 5, 2009", 25 pgs.
"European Application Serial No. 05741083.9, Supplementary European Search Report mailed Mar. 2, 2009", 4 pgs.
"European Application Serial No. 05741083.9, Office Action mailed Mar. 19, 2010", 9 pgs.
"European Application Serial No. 05741083.9, Response filed Sep. 29, 2010 to Office Action mailed Mar. 19, 2010", 16 pgs.
"International Application Serial No. PCT/CA2005/000663, International Search Report mailed Aug. 30, 2005", 2 pgs.
"International Application Serial No. PCT/CA2005/000663, Written Opinion mailed Aug. 30, 2005", 6 pgs.
"International Application Serial No. PCT/CA2005/000669, International Search Report mailed Aug. 18, 2005", 2 pgs.
"International Application Serial No. PCT/CA2005/000669, Written Opinion mailed Aug. 18, 2005", 5 pgs.
"International Application Serial No. PCT/CA2009/000253, International Search Report mailed Jun. 12, 2009", 4 pgs.
"International Application Serial No. PCT/CA2009/000253, Written Opinion mailed Jun. 12, 2009", 7 pgs.
"Singapore Application Serial No. 201002054-3, Office Action mailed Apr. 27, 2011", 8 pgs.
Schrooten, J., et al., "Electrochemical Cell and Membranes Related Thereto", U.S. Appl. No. 61/025,739, filed Dec. 1, 2009, 27 pgs.
"European Application Serial No. 05741066.4, Office Action mailed Sep. 1, 2011", 5 pgs.
"European Application Serial No. 11001213.5, Office Action mailed Aug. 30, 2011", 5 pgs.
"European Application Serial No. 05741083.9, Office Action dated Aug. 12, 2011", 5 pgs.
"Singapore Application Serial No. 201002054-3, Response filed Sep. 22, 2011 to Office Action mailed Apr. 27, 2011", 6 pgs.
"International Application Serial No. PCT/CA2008/001713, International Search Report mailed Jan. 5, 2009", 3 pgs.
"International Application Serial No. PCT/CA2008/001713, Written Opinion mailed Jan. 5, 2009", 4 pgs.
McLean, G. F., "Flexible Fuel Cell", U.S. Appl. No. 60/975,132, filed Sep. 25, 2007, 20 pgs.
Schrooten, J., et al., "Fluid Manifold and Method Therefor", U.S. Appl. No. 12/053,366, filed Mar. 21, 2008, 37 pgs.
"U.S. Appl. No. 12/126,811, Response filed Nov. 15, 2011 to Final Office Action mailed Aug. 3, 2011", 14 pgs.
"U.S. Appl. No. 12/637,422, Notice of Allowance mailed Jan. 24, 2012", 9 pqs.
"Chinese Application Serial No. 201110109407.4, Office Action mailed Jan. 12, 2012". With English Translation, 7 pgs.
"European Application Serial No. 05741083.9, Response filed Dec. 15, 2011 to Office Action mailed Aug. 12, 2011", 18 pgs.
"European Application Serial No. 11001213.5, REsponse filed Nov. 9, 2011 to Office Action mailed Aug. 30, 2011", 10 pgs.
"Machine Traslation of JP 2003-123792A".
"European Serial No. 11001213.5, Partial European Search Report mailed Jan. 30, 2012", 8 pgs.
"European Application Serial No. 12161876.3, Supplementary European Search Report mailed Jul. 13, 2012", 13 pgs.
"U.S. Appl. No. 12/637,422, Notice of Allowance mailed Apr. 2, 2012", 9 pgs.
"Chinese Application Serial No. 200880114733.0, Office Action mailed Jul. 13, 2012", 8 pgs.
"Chinese Application Serial No. 201110109407.4, Response filed May 28, 2012 to Office Action mailed Jan. 12, 2012", CN Translation Only, 7 pgs.
"European Application Serial No. 05741066.4, Office Action mailed May 2, 2012", 5 pgs.
"European Application Serial No. 05741066.4, Response filed Mar. 12, 2012 to Office Action mailed Sep. 1, 2011", 21 pgs.
"European Application Serial No. 08800400.7, Supplementary European Search Report mailed Jun. 29, 2012", 7 pgs.
"European Application Serial No. 11001213.5, Partial European Search Report mailed May 7, 2012", 15 pgs.
Bloomfield, David P., et al., "Electrochemical Cell System with Side-By-Side Arrangement of Cells", (Nov. 23, 1999), 11 pgs, US 5,989,741.
EP Search Report, "EP Search Report", (Aug. 3, 2012).
Ledjeff, Konstantin, et al., "Battery Shaped as a Membrane Strip Containing Several Cells", (Jan. 19, 1999), 13 pgs, US 5,861,221.
Ledjeff, Konstantin, et al., "Polymer Electrolyte Membrane Fuel Cell", (Jan. 26, 1999), 15 pgs, US 5,863,672.

(56) References Cited

OTHER PUBLICATIONS

Marzio Leban, Corvallis, et al., "Pem Fuel Cell", (May 1, 2003), 9 pgs, US 2003/0082425.

Poulin, Gerard, et al., "Polymer Composite Ionic/Electronic Conductance Membrane Methods for the Production Thereof and a Planar Fuel Cell Core Comprising Said Membrane", (Feb. 22, 2007), 53 pgs.

"U.S. Appl. No. 11/290,647, Examiner Interview Summary mailed Oct. 17, 2006", 2 pgs.

"U.S. Appl. No. 12/126,811, Notice of Allowance mailed Mar. 21, 2013", 9 pgs.

"U.S. Appl. No. 12/126,811, Preliminary Amendment mailed Jun. 2, 2008", 10 pgs.

"U.S. Appl. No. 12/207,483, Notice of Allowance mailed Mar. 24, 2009", 7 pgs.

"U.S. Appl. No. 12/920,064, Response filed Feb. 21, 2013 to Restriction Requirement mailed Jan. 23, 2013", 8 pgs.

"U.S. Appl. No. 12/920,064, Restriction Requirement mailed Jan. 23, 2013", 7 pgs.

"U.S. Appl. No. 13/535,880, Non Final Office Action mailed Mar. 14, 2013", 10 pgs.

"U.S. Appl. No. 13/535,880, Response filed Jan. 15, 2013 to Restriction Requirement mailed Nov. 26, 2012", 7 pgs.

"Chinese Application Serial No. 200880114733.0, Office Action mailed Feb. 20, 2013", w/English translation, 15 pgs.

"Chinese Application Serial No. 201110109407.4, Response filed Feb. 22, 2013 to Office Action mailed Oct. 8, 2012", w/English translation, 13 pgs.

"European Application Serial No. 09714121.2, Response filed Feb. 27, 2013 to Extended European Search Report mailed Aug. 3, 2012", 18 pgs.

"European Application Serial No. 11001213.5, Examination Notification Art. 94(3) mailed Jan. 16, 2013", 5 pgs.

"European Application Serial No. 12161876.3, Response filed Feb. 15, 2013 to Extended European Search Report mailed Jul. 13, 2012", 16 pgs.

"U.S. Appl. No. 13/535,880, Restriction Requirement mailed Nov. 26, 2012", 6 pgs.

"Chinese Application Serial No. 200880114733.0, Response filed Nov. 23, 2012 to Office Action mailed Jul. 13, 2012", (w/ English Translation of Amended Claims), 9 pgs.

"Chinese Application Serial No. 201110109407.4, Office Action mailed Oct. 8, 2012", (w/ English Translation), 15 pgs.

"European Application Serial No. 05741066.4, Response filed Oct. 5, 2012 to Office Action mailed May 2, 2012", 30 pgs.

"European Application Serial No. 05741066.4, Office Action mailed Nov. 13, 2012", 5 pgs.

"European Application Serial No. 05741066.4, Supplementary European Search Report mailed May 2, 2008", 3 pgs.

"European Application Serial No. 11001213.5, Amendment filed Dec. 6, 2012", 15 pgs.

"International Application Serial No. PCT/CA2005/000663, International Preliminary Report on Patentability dated Nov. 7, 2006", 7 pgs.

"International Application Serial No. PCT/CA2009/000253, International Preliminary Report on Patentability dated Aug. 31, 2010", 8 pgs.

"International Application Serial No. PCT/CA2088/001713, International Preliminary Report on Patentability dated Mar. 30, 2010", 5 pgs.

"U.S. Appl. No. 12/920,064 , Response filed Oct. 21, 2013 to Non Final Office Action mailed Aug. 2, 2013", 10 pgs.

"U.S. Appl. No. 12/920,064, Non Final Office Action mailed Aug. 2, 2013", 10 pgs.

"U.S. Appl. No. 12/920,064, Response filed Jun. 10, 2013 to Restriction Requirement mailed May 22, 2013", 7 pgs.

"U.S. Appl. No. 12/920,064, Restriction Requirement mailed May 22, 2013", 7 pgs.

"U.S. Appl. No. 13/535,880, Notice of Allowance mailed Aug. 27, 2013", 8 pgs.

"U.S. Appl. No. 13/535,880, Response filed Jun. 11, 2013 to Non Final Office Action mailed Mar. 14, 2013", 9 pgs.

"Chinese Application Serial No. 200880114733.0, Office Action mailed Aug. 14, 2013", w/English translation, 9 pgs.

"Chinese Application Serial No. 200880114733.0, Response filed Oct. 21, 2013 to Office Actiornot mailed Aug. 14, 2013", w/English translation, 7 pgs.

"Chinese Application Serial No. 200880114733.0, Response filed May 7, 2013 to Office Action not mailed Feb. 20, 2013", w/English translation, 9 pgs.

"European Application Serial No. 05741066.4, Response filed May 10, 2013 to Examination Notification Art. 94(3) mailed Nov. 13, 2012", 67 pgs.

"European Application Serial No. 05741083.9, Examination Notification Art. 94(3) mailed Jun. 20, 2013", 5 pgs.

"European Application Serial No. 08800400.7, Response filed Jan. 28, 2013 to Supplementary European Search Report mailed Jun. 29, 2012", 18 pgs.

"European Application Serial No. 11001213.5, Response filed Jul. 23, 2013 to Office Action mailed Jan. 16, 2013", 23 pgs.

"European Application Serial No. 5741066.4, Examination Notification Art. 94(3) mailed Jul. 1, 2013", 6 pgs.

"European Application Serial No. 5741066.4, Response filed Sep. 10, 2013 to Examination Notification Art. 94(3) mailed Jul. 1, 2013", 8 pgs.

"Japanese Application Serial No. 2010-526122, Office Action mailed Apr. 2, 2013", w/English translation, 14 pgs.

"Japanese Application Serial No. 2010-526122, Response filed Sep. 26, 2013 to Office Action mailed Apr. 2, 2013", with English claims, 10 pgs.

"Korean Application Serial No. 10-2010-7009043, Amendment filed Sep. 25, 2013", 17 pgs.

* cited by examiner

FUEL CELL SYSTEMS INCLUDING SPACE-SAVING FLUID PLENUM AND RELATED METHODS

PRIORITY OF INVENTION

This non-provisional application claims the benefit of priority under 35 U.S.C. §119(e) to U.S. Provisional Patent Applications Ser. Nos. 60/975,129 and 60/975,132, filed Sep. 25, 2007, which are herein incorporated by reference.

BACKGROUND

Portable electronic devices are trending to become smaller in size while increasing the demand for performance. As electronic components are designed smaller in size and incorporate sophisticated and complex technology, the demands on the associated power supply become greater. For instance, the power supply may need to occupy less volume or a smaller footprint to accommodate the addition of technology to the component or the decrease in overall component size. Further, the additional technology may require that the power supply last for longer periods of time or that power be delivered at uniform rates for steady electronic component performance.

One example of a power supply is a fuel cell system. A fuel cell system may include one or multiple fuel cell layers, each layer comprising anodes, cathodes, and an electrolyte membrane interposed between the anodes and cathodes. A fuel cell system which includes such a layer typically includes a means for supplying air to the cathode or cathodes and a means for supply of fuel or other reactant fluid to the anode or anodes at an acceptable pressure level.

In order to make a smaller fuel cell system, many technical requirements (e.g. sealing requirements) must still be met while attempting to accommodate the reduced space requirements. For instance, fluid supply components need to continue to supply fuel from a fluid supply to the anode or anodes of the fuel cell. This supply of fuel should be performed at an acceptable pressure level and delivery rate, without occupying an overall significant volume of the fuel cell system, and without compromising the performance of the fuel cell system.

SUMMARY

Embodiments of the present invention relate to a fuel cell system. The system includes a fluid manifold having a first and a second side, at least one manifold outlet in the first side, and a manifold inlet fluidly coupled to the manifold outlet via a fluid directing recess located within the fluid manifold, a fuel cell layer including at least one fuel cell wherein at least a portion of the fuel cell layer is bonded to the first side of the fluid manifold such that the fuel cell layer is substantially adjacent to the first side of fluid manifold and an enclosed region formed by the bonded fuel cell layer and the fluid manifold. The one or more portions of the fuel cell layer or fluid manifold are adapted to deform away from each other upon pressurization of the enclosed region by fluid introduced through the manifold outlet.

Embodiments also relate to a method of operating a fuel cell system including introducing a fluid into an enclosed region of a fuel cell system via a fluid manifold sufficient to increase the pressure within the enclosed region and imparting a stress to one or more portions of the fuel cell layer or the fluid manifold sufficient to transform the enclosed region into a fluid plenum.

Embodiments relate to a flexible fuel cell layer. The layer includes two or more fuel cells substantially integrated within a two-dimensional layer, a substrate coupled to the layer forming an enclosed region between the substrate and layer. The layer can be positioned in a planar or non-planar configuration and the layer is configured such that it is operable when self-supported.

BRIEF DESCRIPTION OF THE DRAWINGS

In the drawings, like numerals describe similar components throughout the several views. Like numerals having different letter suffixes represent different instances of similar components. The drawings illustrate generally, by way of example, but not by way of limitation, various embodiments discussed in the present document.

DETAILED DESCRIPTION

Figure 1:
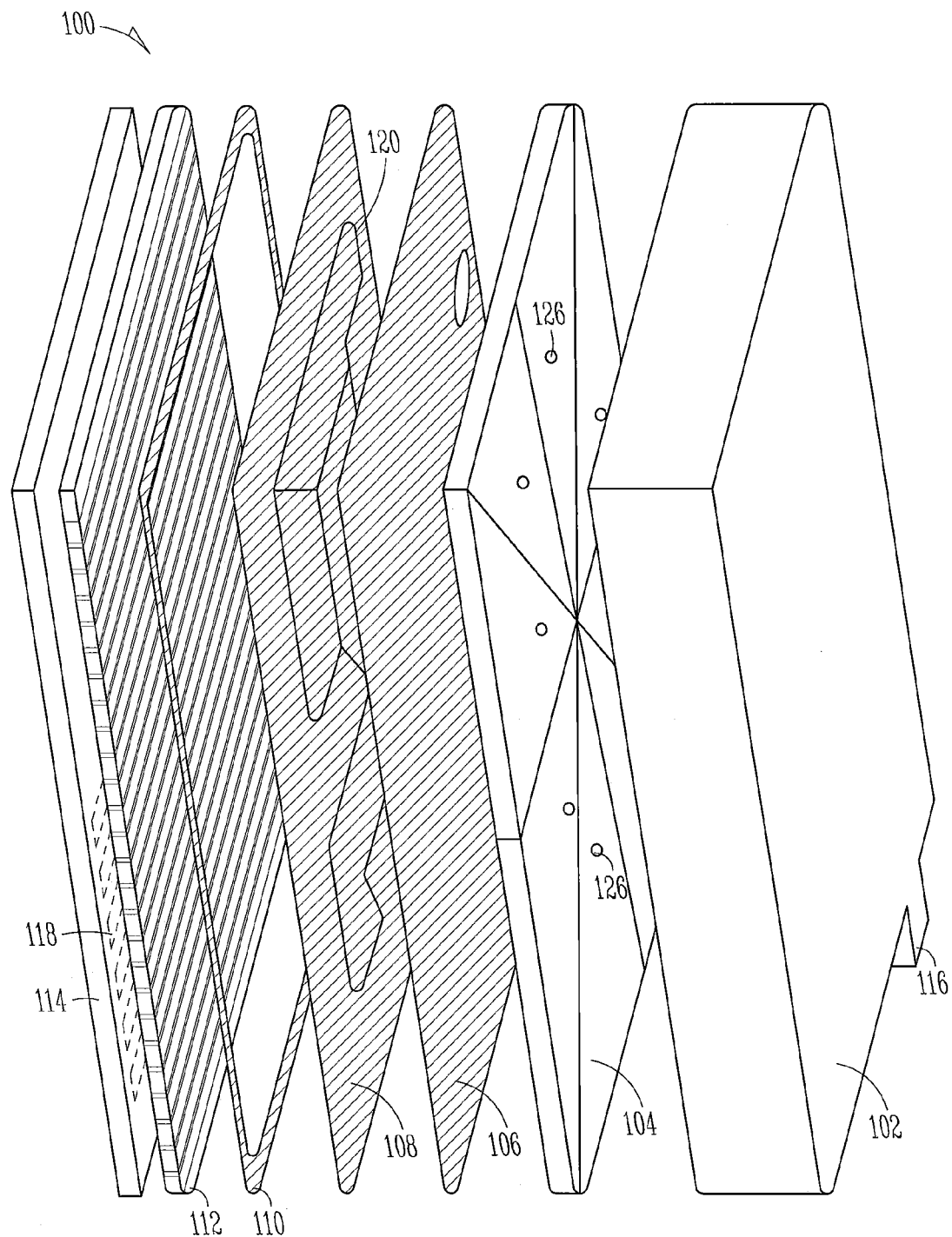
FIG. 1 illustrates an exploded view of a fuel cell system, the fuel cell system including an enclosed region deformable into a fluid plenum when pressurized, according to some embodiments.

The Detailed Description includes references to the accompanying drawings, which form a part of the Detailed Description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Portable electronic devices, such as mobile phones, laptop computers, computer accessories, displays, personal audio or video players, medical devices, televisions, transmitters, receivers, lighting devices including outdoor lighting or flashlights, electronic toys, power tools or any device conventionally used with batteries, are trending to become smaller in size while increasing the demand for performance. Thus, fuel cell systems may need to occupy only a small volume of the overall electrical device volume, while still providing adequate distribution control of fuel or other reactant fluid to the fuel cell. Even so, current fuel cell systems are either too large to be used in the electrical devices or fail to provide the necessary fluid distribution control to allow the devices to function properly. As an example, current portable fuel cell-powered electronic devices are typically designed around the space required by the fuel cells and associated fuel storage, rather than the fuel cell system being designed to fit within the electronic device. Such order of design often results in undesirably bulky devices.

The present inventors have recognized that, among other things, a fluid supply system with reduced volumetric requirements, but which is able to supply fuel or other reactant fluid to the anode or anodes of a fuel cell at an acceptable pressure level and in a uniform manner is needed. The present inventors have further recognized that a deformable enclosed region located between fluid control elements and the fuel cell allows fuel to be supplied to the anode or anodes at an acceptable pressure level and delivery rate, while allowing for a more compact fuel cell system.

In one example, a fuel cell system includes a fluid manifold having first and second sides, at least one manifold outlet in the first side, and a manifold inlet fluidly coupled to the manifold outlet via a fluid directing recess located within the fluid manifold, a fuel cell layer including at least one fuel cell wherein a portion of the fuel cell layer is bonded to the first side of the fluid manifold (such as peripherally bonded), and an enclosed region formed by the bonded fuel cell layer and the fluid manifold.

Initially (e.g. immediately after manufacture), the enclosed region may be essentially volumeless with the fuel cell layer adjacent to the first major side of a substrate, such as a fluid manifold. However, the fuel cell layer, the fluid manifold, or both may be flexible in whole or in part and thus may be deformed under application of modest pressure, or may include inherent material properties, such as elasticity, which enable the components to adapt in response to an imparted stress. Thus, one or more portions of the fuel cell layer or the fluid manifold may deform away from each other when the enclosed region is pressurized by fluid (e.g. fuel) from the manifold outlet. This transforms the enclosed region from being substantially volumeless into a region with sufficient volume to serve as a fluid distribution plenum for the fuel cell layer. Alternately, a stress imparted by the introduction of a pressurized fluid may result in the adaptation or modification of the fuel cell layer, a portion thereof, or the fluid manifold sufficient to transform the enclosed region, either chemically or physically, into a fluid plenum, such as a fuel plenum. If the fluid pressure is reduced again (e.g. after prolonged shutdown), the plenum may collapse in whole or in part depending on how elastic the components are. However, upon reapplication of fluid pressure, the enclosed region once again may inflate or otherwise transform sufficiently to serve as a fluid plenum.

The described fuel cell systems and methods therefore have reduced volumetric requirements. Further, while the fuel cell system may additionally employ external supports or fixtures to support the fluid plenum formed between the fuel cell layer and fluid manifold, external supports or fixtures are not necessary. The flexible fuel cell layer and/or flexible fluid manifold are thus "self-supported" components, that is no external supports or fixturing are required for their function. Such "self-supported" flexible fuel cell layers are useful not only in the fabrication of systems in which there is initially no fluid plenum but they can be useful in other systems as well.

In an example, a distance between the fluid manifold outlet side and the fuel cell layer at a non-pressurized enclosed region state is approximately equal to a cross-sectional thickness of a bond member. In another example, the fluid manifold and the fuel cell layer have a combined cross-sectional thickness of about 5 mm or less, about 1 mm or less, or about 0.6 mm or less at a non-pressurized enclosed region state.

Among other things, the present systems and methods provide for fuel cell systems occupying less volume or a smaller footprint of an electronic component or device into which they are installed, while still meeting the power demands of the component or device. The present fuel cell systems and methods include a space-saving fluid plenum transformable from a substantially volumeless enclosed region and in this way, allows for the creation of smaller, more compact fuel cell systems configurable to fit within an existing electronic device. The enclosed region may be located between a substrate (i.e., fluid manifold) and at least one fuel cell layer. In an example, the enclosed region may be formed by a peripheral-type of coupling between an outlet side of the fluid manifold and the fuel cell layer via suitable bonding means (e.g. a bond member). In varying examples, the enclosed region transforms into a fluid plenum when a fluid exiting the fluid manifold pressurizes the enclosed region causing one or more portions of the fuel cell layer and/or the fluid manifold to deform away from each other. In an example, a distance between the outlet side of the fluid manifold and the fuel cell layer at a non-pressurized enclosed region state is approximately equal to a cross-sectional thickness of a bond member. In another example, the cross-sectional thickness of the bond member is about 0.05 mm or less. In another example, the cross-sectional thickness of the bond member is about 1 mm or less, or about 0.2 mm or less. As will be discussed below, the space-saving fluid plenum can be used in conjunction with other fuel cell components, such as a fluid reservoir, a fluid pressure regulator device(s), a fluid manifold, a bond member, a fuel cell, and an optional external support structure, to create a compact fuel cell system.

Definitions

As used herein, "flexible electrochemical layer" (or variant thereof) refers to include an electrochemical layer that is flexible in whole or in part, so-as-to embrace, for example, an electrochemical layer having one or more rigid components integrated with one or more flexible components. A "flexible fuel cell layer" refers to a layer comprising one or more fuel cells integrated into the layer.

As used herein, "flexible two-dimensional (2-D) fuel cell array" refers to a flexible sheet which is thin in one dimension and which supports a number of fuel cells. A flexible two-dimensional fuel cell array may be an example of a flexible fuel cell layer. The fuel cells have active areas of one type (e.g. cathodes) that are accessible from one face of the sheet and active areas of another type (e.g. anodes) that are accessible from an opposed face of the sheet. The active areas may be disposed to lie within areas on their respective faces of the sheet (e.g. it is not mandatory that the entire sheet be covered with active areas, however, the performance of a fuel cell may be increased by increasing its active area.

As used herein, "self-supported" refers to an electrochemical cell layer if, when coupled to a substrate, no external fixturing is required to create and/or maintain the integrity of a fuel plenum when in use.

As used herein, "adjacent" or "adjacently", when used in the context of the fuel cell layer being adjacent to the fluid manifold, refers to a fuel cell layer is close enough proximity to the fluid manifold such that the enclosed region is too small to effectively function as a fluid distribution plenum.

As used herein, "bonding member" refers to an implicit or explicit component that facilitates the coupling of two objects. In an example, an implicit bonding member may include an adhesive or weld. An explicit bonding member may include a mechanical fastener, for example.

As used herein, "operable" refers to an electrochemical cell layer or individual electrochemical cell capable of producing an electrical current or voltage. For example, a fuel cell layer may be in an operable position and capable of producing electricity without further manipulation in position or configuration.

As used herein, "substrate" refers to a component coupled to an electrochemical cell layer, sufficient to create an enclosed space. A substrate may include, among other things, a fluid manifold, a fuel cell system structural member, fluidic control components, fluid reservoir, a portion of an electronic device or a combination thereof. Fluidic control components may include pressure regulator devices, such as an array of regulators, for example.

As used herein, "deform" or "deformation" refers to in general, the behaviour of a material, component, structure, or composite layer in response to an imparted stress. A deformation may be an intended result, or it may be an unintended side effect. A deformation may be of a large enough magnitude to be clearly visible to the naked eye (e.g on the order of millimeters), or may be small enough that it can only be detected with the aide of a microscope (e.g. on the order of micrometers or nanometers). A deformation may comprise the 'flexing' or 'bending' of a component, or may alternately comprise compression or other such change in shape of a component.

Referring now to the drawings, particularly to FIG. 1, which illustrates an exploded view of a fuel cell system 100 comprising, but not limited to, a fluid reservoir 102, an optional fluid pressure regulator assembly 104 including multiple fluid pressure regulator devices 126, a manifold sealing layer 106, a manifold conduit layer 108, a bond member 110, a fuel cell layer 112, and an external support structure 114. The fluid reservoir 102 provides fuel or other reactant fluid for the fuel cell system 100 and can be charged or refueled via a charge port 116. In an example, the fluid reservoir 102 can comprise a cellular fuel tank, such as is discussed in commonly-owned Zimmermann, U.S. patent application Ser. No. 11/621,501, entitled "CELLULAR RESERVOIR AND METHODS RELATED THERETO," or other fluid enclosure as is discussed in commonly-owned Zimmermann, U.S. patent application Ser. No. 11/473,591, entitled "FLUID ENCLOSURE AND METHODS RELATED THERETO."

A fluid manifold, which may optionally include one or more of the fluid pressure regulator assembly 104, the manifold sealing layer 106, and the manifold conduit layer 108 provides for the distribution, regulation, and transfer of fuel from the fluid reservoir 102 to the fuel cell layer 112. In this example, the fluid pressure regulator assembly 104 controls the fuel pressure coming out of the fluid reservoir 102 by reducing a primary (higher) fluid pressure present therein to a more constant secondary (lower) fluid pressure for delivery to the fuel cell layer 112. A fluid manifold, including the manifold sealing layer 106, the manifold conduit layer 108, and the fluid pressure regulator assembly 104, is fluidly coupled to the fuel cell layer 112 via a material directing recess 120. The material directing recess 120 of the fluid manifold directs the flow of fuel from the fluid pressure regulator assembly 104 to a region adjacent to the fuel cell layer 112, and can be formed by creating one or more channels in the manifold conduit layer 108, for example. In an example, the fluid manifold includes a layered structure that allows for the manifold to be of a size that does not take up unnecessary volume, nor an unnecessarily large footprint, yet allows for the pressure, volume, or temperature requirements for fuel cell systems 100 to be met, as is discussed in commonly-owned Schrooten et al., U.S. patent application Ser. No. 12/053,366, entitled "FLUID MANIFOLD AND METHODS THEREFOR."

The fuel cell layer 112 includes fuel cell layers (i.e., comprising at least one anode and cathode) with an electrolyte interposed therebetween. In an example, the fuel cell layer 112 utilized in the system 100 can be planar, as is discussed in commonly-owned McLean et al., U.S. patent application Ser. No. 11/047,560, entitled "ELECTROCHEMICAL CELLS HAVING CURRENT-CARRYING STRUCTURES UNDERLYING ELECTROCHEMICAL REACTION LAYERS." In such an example, an electric current-carrying structure that collects power generated by the fuel cell layer 112 underlies, at least in part, one of the fuel cell layers.

In the present invention, either the fuel cell layer or the fluid manifold is flexible such that it can be deformed under pressure. In such an example, one or more fuel cells are substantially integrated within a flexible electrochemical layer. The flexible electrochemical layer may optionally include one or more rigid components, and thus, may not be flexible in its entirety. In operation of the fuel cell system 100, the anode of each cell receives the fuel from the fluid reservoir 102 and the cathode of each cell receives air containing oxygen as an oxidizing agent via one or more air access ports 118 in the external support structure 114, for example.

Figure 2:
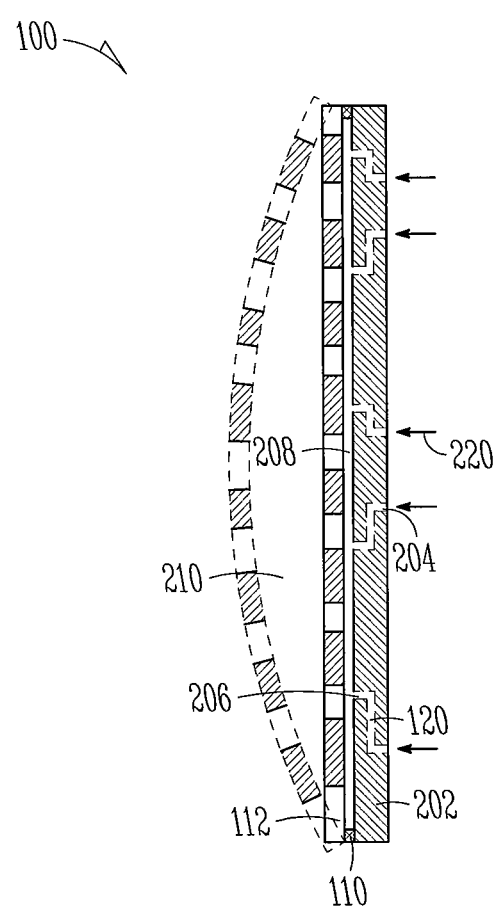
FIG. 2 illustrates a cross-sectional view of portions of a fuel cell system, including a fluid manifold, a bond member, and at least one fuel cell, according to some embodiments.

FIG. 2 illustrates a cross-sectional view of portions of the fuel cell system 100, including fluid manifold 202, bond member 110, and fuel cell layer 112. The fuel cell layer 112 is coupled with portions of fluid manifold 202 via bond member 110, and in this way, creates one or more enclosed regions 208 therebetween. Bond member 110 can include any physical or chemical means, such as protrusions or at least one of an adhesive member, a weld member, a solder member, a braze member, or a mechanical fastener. For instance, bond member 110 can be a structural thermoset epoxy adhesive that may be cured under appropriate conditions of heat, pressure, or combinations thereof to create the bond between fluid manifold 202 and fuel cell layer 112. Heating and pressing may be done simultaneously or sequentially. In an example, enclosed region 208 has a thickness that is approximately equal to a cross-sectional thickness of bond member 110, such as about 0.05 mm or less. In another example, fluid manifold 202 and fuel cell layer 112 have a combined cross-sectional thickness of about 5 mm or less, 1 mm or less, or 0.6 mm or less.

As shown, fluid manifold 202 may include a material directing recess 120 extending therethrough. Each material directing recess 120 receives, at an input 204, fuel flow 220 from fluid reservoir 102 (FIG. 1) and provides, at an output 206, fuel flow 220 to the enclosed region 208. In an example, the fuel flow includes at least one of hydrogen, methanol, formic acid, butane, borohydride compounds (including sodium and potassium borohydride), or liquid organic hydrogen carriers. The continuing receipt of fuel flow 220 to the enclosed region 208 causes portions of fuel cell layer 112 to deform from a position adjacent the fluid manifold 202, thereby forming fluid plenum 210. Fluid plenum 210 is sufficient in size to serve as a fuel distribution plenum for the fuels cells incorporated in fuel cell layer 112. In operation, fluid reservoir 102 (FIG. 1) is filled with fuel by pressurizing the charge port 116 (FIG. 1). Fluid pressure regulator assembly 104, including an array of fluid pressure regulator devices 126 (FIG. 1), can be used to reduce or maintain a pressure in fluid plenum 210 to a level sufficient for the operation and movement of the fuel cells in fuel cell layer 112, such as to the position shown in phantom. In an example, a distance between fluid manifold 202 and the fuel cell layer 112 is about 5 mm or less at the pressurized plenum state. In some embodiments, a distance between fluid manifold 202 and the fuel cell layer 112 may be substantially the same in the pressurized plenum state as in the unpressurized plenum state, where deformation of the fuel cell layer may be very small. In some embodiments, such as when the system includes internal supports, portions of the fuel cell layer may deform sufficient to transform the enclosed space into a fluid plenum while some portions may remain stationary.

Figure 3A:
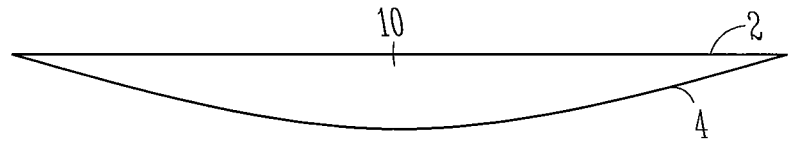
FIGS. 3A-3E illustrate simplified cross-sectional views of various other embodiments in which either the fuel cell layer or the fluid manifold or both deform to create a fluid plenum when the enclosed region is pressurized, according to some embodiments.
Figure 3B:
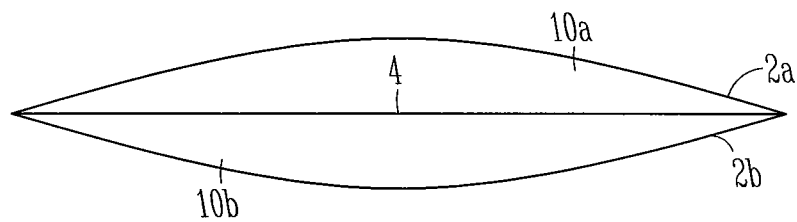

FIGS. 3A-3E illustrate cross-sectional views of various other embodiments of the invention in which either the fuel cell layer or the fluid manifold or both deform to create a fluid plenum when the enclosed region is pressurized. In FIG. 3A, fluid manifold 4 is a flexible component and fuel cell layer 2 is relatively rigid. When fluid is admitted to the enclosed region in between, fluid plenum 10 is created. (Compare this embodiment to that in FIG. 2 in which fuel cell layer 112 is flexible and fluid manifold 202 is relatively rigid.) FIG. 3B shows yet another alternative in which the system comprises two flexible components. In FIG. 3B, there are two flexible fuel cell layers 2a, 2b bonded to fluid manifold 4. Upon pressurizing the enclosed regions therebetween, two fluid plenums 10a, 10b are formed.

Figure 3C:
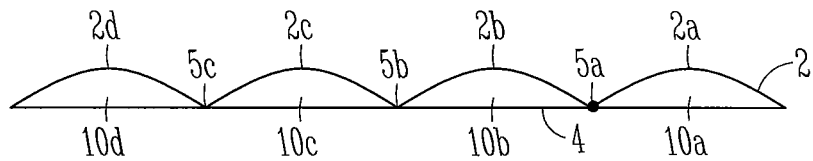
Figure 3D:
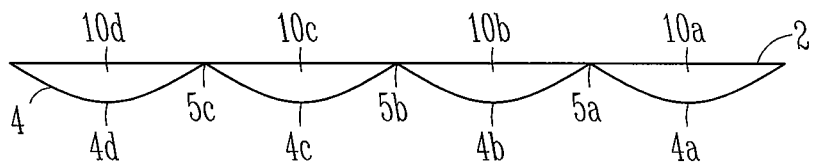
Figure 3E:
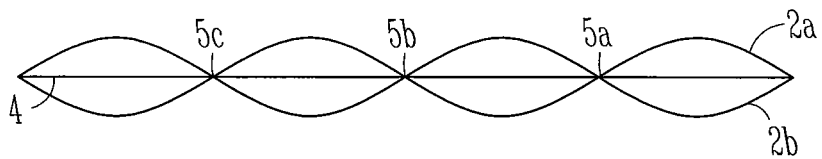

FIGS. 3C-3E show yet further alternatives comprising internal supports such as bond members, spacers, collapsible columns, combinations thereof, or the like, that are intended to at least restrict the outward expansion of the flexible layers in the assembly. The reason for this is that during any movement, the flexible layers may change position or move outwardly and the risk of rupture increases. This approach may prevent such ruptures. One or more internal supports may collapse or expand in response to movement in the flexible layer. Referring to FIG. 3C, a cross sectional view of an embodiment comprising flexible fuel cell layer 2, relatively rigid fluid manifold 4, and internal supports is shown. One or more internal supports or bonds 5a-5c may be part of a gas management system, whose function may be, in part, to structurally support flexible fuel cell layer 2 during any movement thereof. (One example of movement may be a result of the pressurization and de-pressurization of a plenum in spaces 10a-10d.) As shown in FIG. 3C, fuel cell layer 2 is bonded at support sites 5a-5c to fluid manifold 4. In particular, the support sites at 5a-5c can be configured to align with one or more current collectors of the fuel cell layer and may employ a conductive epoxy adhesive in order to bond fluid manifold 4 to fuel cell layer 2. The conductive epoxy adhesive may be cured under appropriate conditions of heat, pressure, or combinations thereof. Heating and pressing may be done simultaneously or sequentially. The conductive epoxy may serve as part of the current collection system in the fuel cell and may be integral with fluid manifold 4, or may be in electrical contact with an electrically conductive portion of fluid manifold 4. As a result, a series of plenums 10-10d are formed by portions 2a-2d of fuel cell layer 2 as they inflated with pressurizing fluid. In some embodiments, portions of the fuel cell layer may be directly bonded or attached to the fluid manifold, for example by way of an adhesive member. In embodiments such as that shown in FIG. 3C, any deformation of the fuel cell layer may be extremely small, or almost imperceptible. For example, if the distance between subsequent bond members is sufficiently small, the unsupported area of the flexible fuel cell layer may also be small, and therefore the layer may not noticeably deform when the system is pressurized with a fluid.

FIG. 3D shows an embodiment equivalent to that shown in FIG. 3C except that here, fluid manifold 4 is a flexible component and fuel cell layer 2 is relatively rigid. Again, bonds 5a-5c are made between fuel cell layer 2 and fluid manifold 4 thereby creating a series of enclosed regions. As before, these regions are transformed, via deformation of portions 4a-4d of fluid manifold 4, to become a series of fluid plenums 10a-10d when fluid pressure is admitted to the enclosed regions.

FIG. 3E shows yet another alternative with internal supports (bonds) in which the system comprises two flexible components. In FIG. 3E, there are two flexible fuel cell layers 2a, 2b bonded to fluid manifold 4 at the periphery and at several internal locations 5a-5c. Again, this forms a series of enclosed regions which, when pressurized with fluid, are transformed into numerous fluid plenums. (Note: in FIG. 3E, certain identifying indicia present in the preceding Figures have been omitted for purposes of avoiding clutter.)

The flexibility of the system allows for fuel cell placement and utilization in spaces and sizes not previously practical. The fuel cell system may conform with or within the structure of the device to which it provides power. The fuel cell layer or fuel cells may be manufactured in a planar configuration, but then be bent, twisted or otherwise conformed to a non-planar configuration for positioning and/or use. The layer or layers may move during operation or remain unchanged in position during operation. The flexible fuel cell layer may be manufactured in a planar form, but then positioned in a non-planar configuration.

Fuel cells according to the invention may be incorporated into the structure of any device which is powered, either in part or completely, by a fuel cell system. The invention consequently reduces the intrusion of the fuel cells within the envelope of the device being powered. This permits portable electrically-powered devices to be made more compact and/or permits the volume within the housing of a portable electronic device that would otherwise be occupied by batteries or another electrical power source to be used for other purposes.

A flexible fuel cell may include flexible layers, such as first and second flexible layers. The flexible layers may be contacted by one or more bond members and there may be a space in between. The fuel cell layer may be coupled to a substrate, creating an enclosed space. The fuel cell layer may be positioned in a planar or non-planar configuration and be operable in such a self-supported position.

The flexible layers include one or more fuel cells which may be thin-layer fuel cells or planar fuel cells in a two-dimensional array, for example. The fuel cells may be substantially integrated into the layer, such that the fuel cells are nearly or fully within the dimensions of the layer, for example. The flexible fuel cell layer may also include additional fuel cell components, such as current collection components. The current collection components may be in contact with two or more fuel cells present in the layer or layers. The current collection components may be substantially integrated within the layer, for example. In addition, fluidic control components may be integrated into the layer as well, such as pressure regulator devices. One or more fluid pressure regulator devices may be integrated and include an array of co-planar fluid pressure regulator devices, each fluidic pressure regulator device acting independently from the others.

The one or more fuel cells may form an array made up of individual fuel cells that are arranged two-dimensionally in any of various suitable ways on an area covered by the array. For example, cathode regions of individual fuel cells may be arranged to provide one or more of: one or two or more columns of substantially parallel stripes; shapes distributed at nodes of a two-dimensional lattice configuration (which could be a rectangular, square, triangular or hexagonal lattice, for example and which is not necessarily completely regular); a pattern of shapes distributed in both a width and a length dimension of the area covered by the array (such a pattern may be less regular than a lattice-type pattern), for example.

Thin layer fuel cells may be arranged into bipolar or unipolar arrays constructed of very thin layers. Within such an array, individual unit fuel cells may be connected in a series or series-parallel arrangement. Connecting fuel cells in such an arrangement permits electrical power to be delivered from an array of fuel cells at increased voltages and reduced currents. This, in turn, permits electrical conductors having smaller cross-sectional areas to be used to collect the electrical current.

For example, in some embodiments, individual unit fuel cells each produce electrical current at a voltage of less than 1 volt (typically about 0.6 volts) and enough individual fuel cells are connected in series within the array of fuel cells to produce an output voltage in excess of 6, 12, 48 or more volts. Providing output at higher voltages can be important because the electrical power produced by an array of fuel cells scales approximately with the area of the array. Therefore, for output at a fixed voltage, the current being supplied when the array of fuel cells is delivering its rated output power increases rapidly with the dimensions of the fuel cell array. Large and heavy conductors would be required to carry significant amounts of electrical power at the low output voltages provided by conventional unit fuel cells.

A further feature of some thin layer fuel cells is that the thin layer fuel cells can include current collecting conductors that are embedded within the fuel cell layers themselves. This reduces or avoids the need to provide current collecting conductors external to the thin layer fuel cells.

Conventional fuel cell stacks may require internal plumbing to carry air and oxidant to each unit fuel cell, but the thin layer fuel cells may provide arrays of unit fuel cells that do not require any special plumbing to allow air to contact the cathodes of the fuel cells. The unit fuel cells are arranged so that oxygen from ambient air present on one side of the array of fuel cells can readily contact cathodes of the unit cells. Thin layer fuel cells may comprise arrays of individual unit fuel cells that are organized in geometrical arrangements over a 2D surface. On one side of the surface, cathodes of the unit fuel cells are exposed at different locations on the surface for contact with an oxidant, such as air.

These thin layers provide design flexibility by allowing integration of the fuel cells with the structure of the device they are to power. The invention reduces interior space requirements of the fuel cells, maximizing the volume available for fuel storage or other system components.

In some embodiments of the invention, fuel cells are provided in arrays which are less than about 5 mm thick (possibly not including a fuel plenum, if present). The fuel cells can be in the range of about 0.1 mm to about 2 mm thick, for example. Some fuel cell constructions can provide fuel cell layers that are even thinner than this. The layers can be free standing or supported. The layers can provide useful current and voltage levels, resulting in a power output that can be exploited by portable devices.

Examples of flexible fuel cell layers that may adapted for use in the present invention may be found in commonly-owned McLean, et. al., U.S. patent application Ser. No. 11/327,516, entitled "FLEXIBLE FUEL CELL STRUCTURES HAVING EXTERNAL SUPPORT", the disclosure of which is herein incorporated in its entirety.

Figure 4A:
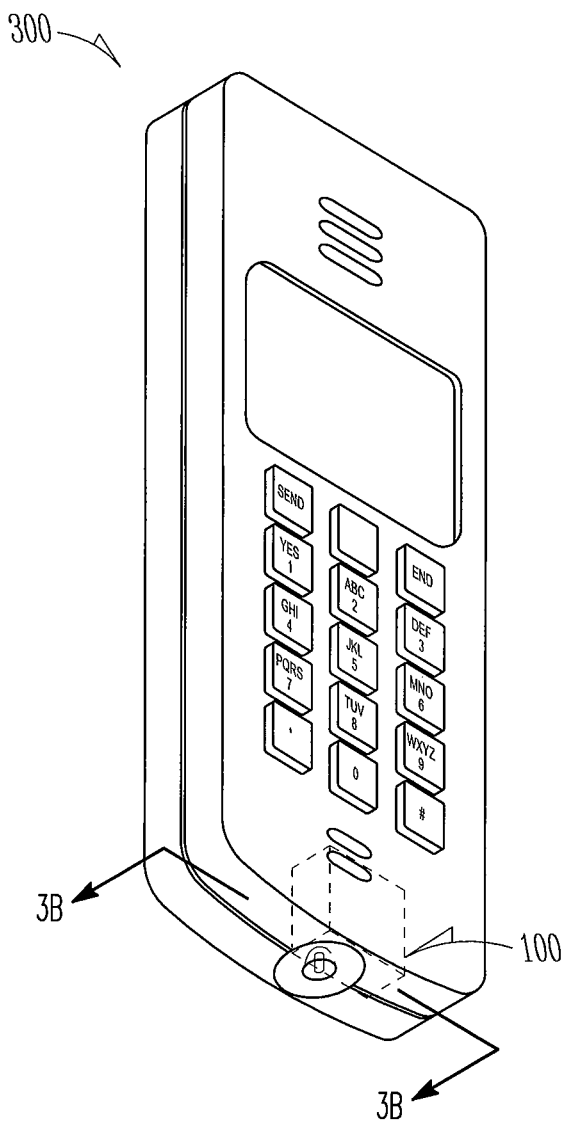
FIG. 4A illustrates an isometric view of a portable electronic device powered by a fuel cell system, according to some embodiments.

FIG. 4A illustrates one example of a fuel cell-powered electronic device, and more specifically, a mobile phone 300 including the fuel cell system 100. As discussed above, the present fuel cell system 100 includes a space-saving fluid plenum 210 (FIG. 2) transformable from a substantially volumeless enclosed region 208 (FIG. 2). In this way, the fuel cell system 100 can be made in compact configurations to fit within an existing electronic device, such as the mobile phone 300. While a mobile phone 300 is shown in FIG. 4A, the present fuel cell system 100 can be configured in a small, compact volume for use with other portable electronics devices, such as laptop computers, computer accessories, displays, personal audio or video players, medical devices, televisions, transmitters, receivers, lighting devices including outdoor lighting or flashlights, electronic toys, power tools or any device conventionally used with batteries.

Figure 4B:
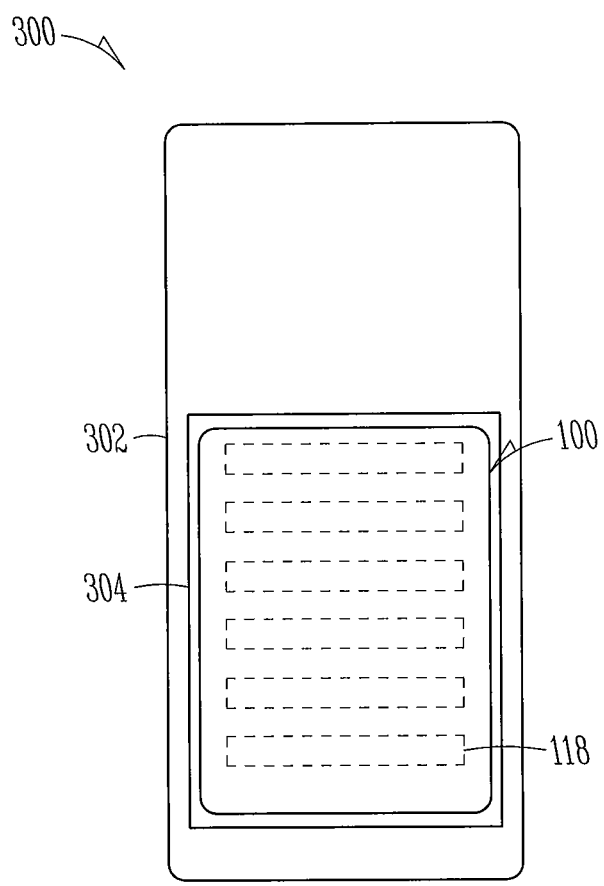
FIG. 4B illustrates a cross-sectional view of a portable electronic device powered by a fuel cell system, such as along line 3B-3B of FIG. 4A, according to some embodiments.

FIG. 4B illustrates a cross-sectional view of the mobile phone 300, such as along line 3B-3B of FIG. 4A. Due to the very limited amount of space inside the mobile phone 300, any internally positioned power source must be small and compact in size and shape. Beneficially, the present fuel cell system 100 including the substantially volumeless enclosed region 208 (FIG. 2) transformable into the fluid plenum 210 (FIG. 2) can meet such size and shape requirements. In an example, a battery cover 302 of the mobile phone 300 includes a pocket 304 about 0.6 mm deep to accommodate portions of the compact fuel cell system 100, such as the fluid manifold 202 (FIG. 2) and the fuel cell layer 112 (FIG. 2), which are coupled by the bond member 110 (FIG. 2). In another example, the battery cover 302 provides an external support structure to limit the outward deformation of the fuel cell layer 112 away from the fluid manifold 202 during powering operations of the mobile phone 300. In this example, the battery cover 302 includes multiple air access ports 118 to allow the cathodes of the fuel cell layer 112 to receive air for use as an oxidizing agent.

The present fuel cell system can be used to adequately power other electronic devices in addition to the mobile phone 300 (FIGS. 4A-4B), such as a laptop computer. The fuel cell system is positioned within an outer casing of the laptop display portion. The outer casing can include one or more air access ports to allow the fuel cell system with access to ambient air.

As discussed above, the fuel cell system 100 can include one or more fluid pressure regulator devices 126 to control the flow of fuel pressure coming out of the fluid reservoir 102 (FIG. 1) by reducing a primary (higher) fluid pressure present in the fluid reservoir 102 to a more constant secondary (lower) fluid pressure for delivery to the fuel cell layer 112 (FIG. 1).

A single fluid pressure regulator device 126 may be used or alternatively, it is contemplated that a fluid pressure regulator assembly 104 including multiple regulators 126 can be used with the present fuel cell system 100 (FIG. 1). The present inventors have recognized that it may be beneficial in some examples for the fuel distribution flow to the enclosed region, and ultimately consumed by the anodes of the fuel cell layer 112, be uniform. Thus, instead of relying on a single point of fluid pressure regulation control from the fluid reservoir 102 and single inlet to the fluid manifold 202, the fluid pressure regulator assembly 104 can be used to provide active, local, and uniform control of fuel pressure and flow applied into and through (via material directing recesses 120) the fluid manifold 202. In an example, the multiple fluid regulator devices 126 can be formed on the same layers, resulting in co-planar fluid regulator devices. Further, multiple inlets and/or outlets may be employed to direct fluid to and from fluid manifold 202. And, further still, the inlets may be located on the major or the minor sides of fluid manifold 202.

Figure 5:
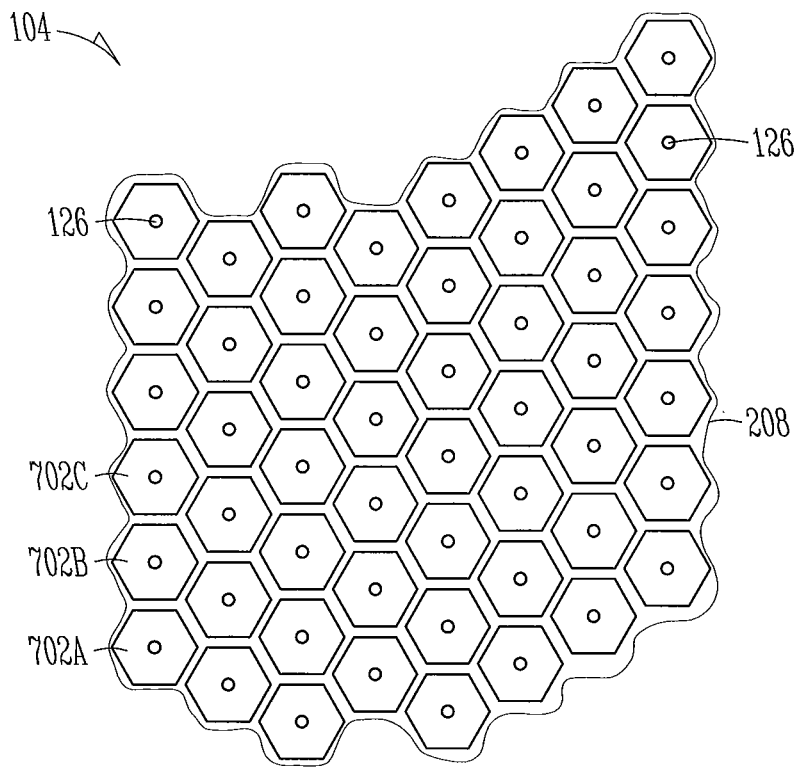
FIG. 5 illustrates a cross-sectional view of an array of fluid pressure regulator devices, according to some embodiments.

FIG. 5 illustrates a cross-section view of the array of fluid pressure regulator devices 126 of the fluid pressure regulator assembly 104, as constructed in accordance with an example. As shown in FIG. 5, the array of fluid pressure regulator devices 126 can be spatially distributed so that each regulator distributes fuel or other reactant fluid into a different portion of the enclosed region 208. In an example, the enclosed region 208 is partitioned into a number of discrete regions 702A, 702B, 702C, etc. as shown, with each region served by one or more fluid pressure regulator devices 126. In another example, each fluid pressure regulator device 126 acts independently from the others to maintain proper fuel pressure in the respective region of the enclosed region 208 for steady delivery of fuel to the anodes of the at least one fuel cell 112 (FIG. 1).

The fluid manifold 202 includes at least one conduit layer that, in an option, is relatively thin, for example, when compared with the length and width. In an example, the thickness of conduit layer 108 is generally less than about 1 mm. In another example, the thickness of conduit layer 108 is about 50 µm-1 mm. In another example, the width and length of conduit layer 108 is about 1 mm and 100 mm, respectively. The width, length, or thickness can be altered for geometry of the fuel cell system 100 (FIG. 1) in which the manifold is installed.

Conduit layer 108 further includes at least one material directing recess 120 therein. Material directing recess 120, in an option, extends through the conduit layer 108, from one side to the other side. The conduit layer 108 is optionally formed of metals, plastics, elastomers, or composites. Material directing recess 120 can be etched, stamped, or otherwise created within or through the conduit layer 108. In another option, material directing recess 120 can be drilled within or through the conduit layer 108, formed with a laser, molded in the layer, formed via die cutting or otherwise machined in the layer. In an example, material directing recess 120 has a width of about 5 to 50 times the depth of the recess. In another example, recess 120 has a width about 1 mm-2 mm. In yet another example, material directing recess 120 has a width of about 50-100 µm.

The fluid manifold 202 further optionally includes at least one sealing layer 106 and can include first and second sealing layers on opposite sides of the conduit layer 108. This allows for material directing recess 120 to be enclosed and form a conduit thorough which material can travel. The sealing layers can be coupled with the conduit layer 120, for example, but not limited to, using adhesives, bonding techniques, laser welding, or various other conventional methods.

Figure 6:
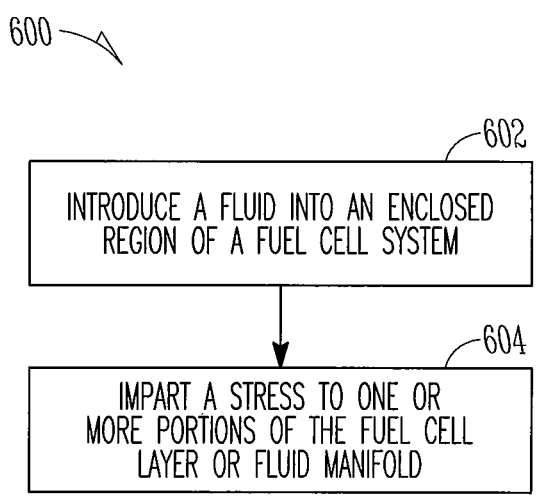
FIG. 6 illustrates a block flow diagram of a method of using a fuel cell system, according to some embodiments.

FIG. 6 illustrates a block flow diagram 600 of a method of using a fuel cell system including a space-saving fluid plenum. A fluid may be introduced 602 into an enclosed region of a fuel cell system, sufficient to increase the pressure within the enclosed region. A stress may be imparted 604 to one or more portions of the fuel cell layer or the fluid manifold, sufficient to transform the enclosed region into a fluid plenum. The stress may cause a deformation in the fuel cell layer, fuel manifold or both, causing them to move away from each other. Introducing 602 the fluid may occur at a pressure less than a fluid reservoir pressure, for example. One or more fuel cells in the fuel cell layer may be activated upon introducing the fluid 602. Deforming 604 may include urging portions of the fuel cell layer about 5 mm or less away from the fluid manifold.

The present fuel cell systems and methods include a space-saving fluid plenum transformable from a substantially volumeless enclosed region and in this way, allows for the creation of smaller, more compact fuel cell systems configurable to fit within an existing electronic device while still providing an effective structure to control the distribution of fluid, such as fuel, to the fuel cells. The enclosed region is located between a fluid manifold, which may include a fluid pressure regulator device(s), and a fuel cell layer. The enclosed region may be formed by a coupling between an outlet side of the fluid manifold and the fuel cell layer via a suitable bonding method. The coupling may be an adjacent bond, such that the enclosed space created is not able to function as a fluid distribution plenum without a stress being imparted on the fuel cell layer, fuel manifold or both by a fluid pressurization. In varying examples, the enclosed region transforms into a fluid plenum when a fluid exiting the manifold pressurizes the enclosed region, imparting a stress to one or more one or more portions of the fuel cell layer and/or the fluid manifold, which may result in portions or all of the layer and/or manifold to deform away from each other. In some embodiments, the stress imparted may result in deformation sufficient to provide a fuel plenum which enables operation of the fuel cell layer, but which may or may not be visibly or externally perceptible. The curvature of the fuel cell layer and/or fluid manifold shown in the figures is for illustrative purposes, and in some embodiments, the fuel cell layer and/or fluid manifold may be less curved, or may be substantially planar.

EXAMPLE 1

In an example, a flexible fuel cell layer with an array of strip-like fuel cells, constructed in accordance with commonly-owned U.S. patent application Ser. No. 11/047,560, arranged in a generally parallel formation was bonded to a generally rigid fluid manifold using a structural adhesive member to form a peripheral seal. The fuel cell system further comprised internal adhesive support members arranged in a parallel configuration such that the current collecting structures of the fuel cell array were bonded directly to the fluid manifold such that the fuel cell array was substantially adjacent to the fluid manifold. When pressurized fluid (e.g. hydrogen) was introduced into the system, there was no visible deformation of the fuel cell layer, suggesting that no fluid plenum could have been formed; however, the fuel cell layer operated to produce electricity, implying that, in fact, a fuel plenum was indeed formed within the enclosed space between the fuel cell layer and the fluid plenum sufficient to enable fuel to react with the anodes of the fuel cell layer. Furthermore, in this example, no external supports were employed to enable operation of the fuel cell system, essentially allowing the fuel cell system to operate in a 'self-supported' configuration.

EXAMPLE 2

In a second example a flexible fuel cell layer with an array of strip-like fuel cells, constructed in accordance with commonly-owned U.S. patent application Ser. No. 11/047,560, arranged in a generally parallel formation was bonded to a generally rigid fluid manifold using a structural adhesive member to form a peripheral seal. No internal supports were used; however, the system was dimensionally constrained using an external framework, such that the fuel cell layer was constrained substantially adjacent to the fluid manifold. In this embodiment, when pressurized fluid (e.g. hydrogen) was introduced into the system, there was a very small but visibly perceptible deformation of the fuel cell layer (i.e. about 0.5 mm total deflection), suggesting that a fluid plenum had been formed. Again, the fuel cell layer operated to produce electricity, confirming that a fluid plenum had been formed sufficient to enable fuel to react with the anodes of the fuel cell layer.

The above description is intended to be illustrative, and not restrictive. For example, the above-described examples (or one or more features thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. In addition, while the majority of this patent document discusses fuel or reactant based fluid applications, the present systems and methods can be used for other fluid transfer applications in ways similar to those discussed herein. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A fuel cell layer, comprising:
    a flexible fuel cell layer that includes two or more fuel cells and current collection components, wherein the two or more fuel cells and the current collection components are both substantially integrated within a two-dimensional layer; and
    wherein a fluid manifold is coupled to the flexible fuel cell layer with a peripheral seal to form an enclosed region between the fluid manifold and the flexible fuel cell layer, wherein the enclosed region is defined by the fluid manifold and the two or more fuel cells of the flexible fuel cell layer,
    wherein the fluid manifold is also coupled to the flexible fuel cell layer with one or more internal supports, wherein the internal supports are bonded to both the flexible fuel cell layer and the fluid manifold and wherein the one or more internal supports are configured to restrict outward expansion of the flexible fuel cell layer,
    wherein the flexible fuel cell layer is configured such that it is operable when self-supported,
    wherein the two or more fuel cells define at least a portion of the enclosed region,
    wherein the fluid manifold is configured to maintain a fuel at a uniform pressure throughout the enclosed region,
    wherein the fluid manifold further includes a manifold conduit layer and a first sealing layer and wherein the manifold conduit layer and the first sealing layer define a channel through which fuel can travel, and
    wherein the fluid manifold further includes a second sealing layer and wherein the first sealing layer is coupled to a first side of the manifold conduit layer and the second sealing layers is coupled to a second side of the manifold conduit layer and wherein the first side of the manifold conduit layer is opposite the second side of the manifold conduit layer.

2. The fuel cell layer of claim 1, wherein the flexible fuel cell layer is in further fluid communication with a fluidic control component, a fluid pressure regulator device, a fluid reservoir, a portion of an electronic device or a combination thereof.

3. The fuel cell layer of claim 1, wherein the one or more internal supports collapse or expand in response to movement in the flexible fuel cell layer.

4. The fuel cell layer of claim 1, wherein the one or more internal supports include at least one of an adhesive member, a weld member, a solder member, a braze member, and a mechanical fastener.

5. The fuel cell layer of claim 1, wherein the fluid manifold further includes one or more fluid pressure regulator devices.

6. The fuel cell layer of claim 5, wherein the one or more fluid pressure regulator devices includes an array of co-planar fluid pressure regulator devices, each fluidic pressure regulator device acting independently from the others.

7. The fuel cell layer of claim 6, wherein at least a portion of the internal supports are electrically conductive.

8. The fuel cell layer of claim 7, wherein the internal supports are in contact with one or more electrically conductive portions of the fluid manifold.

9. The fuel cell layer of claim 1, wherein the one or more internal supports include one or more spacers, collapsible columns, or a combination thereof and wherein the one or more internal supports are configured to divide the enclosed space into a series of plenums when the enclosed region is inflated with pressurizing fluid.

10. The fuel cell layer of claim 1, further comprising an external support structure disposed to limit the outward deformation of the flexible fuel cell layer or the fluid manifold away from each other.

11. The fuel cell layer of claim 10, wherein the external support structure includes a portion of an outer housing of a portable electronic device.

12. The fuel cell layer of claim 1, wherein the flexible fuel cell layer includes a fuel cell array.

13. The fuel cell layer of claim 1, wherein the flexible fuel cell layer can be positioned in a non-planar configuration for operation.

14. The fuel cell layer of claim 1, wherein the flexible fuel cell layer can be positioned in a planar configuration for operation.

15. The fuel cell layer of claim 1, wherein the flexible fuel cell layer is coupled to the fluid manifold with an adhesive layer disposed between the fuel cell layer and the fluid manifold.

16. The fuel cell layer of claim 1, wherein the fluid manifold includes a fluid pressure regulator assembly and a manifold conduit layer.

17. The fuel cell layer of claim 16, wherein the fluid pressure regulator assembly is configured to control pressure of the fuel.

18. The fuel cell layer of claim 16, wherein the manifold conduit layer includes one or more channels configured to direct flow of the fuel from the fluid pressure regulator assembly to a region adjacent to the flexible fuel cell layer.

19. The fuel cell layer of claim 16, wherein the manifold conduit layer is disposed between the flexible fuel cell layer and the fluid pressure regulator assembly.

20. The fuel cell layer of claim 1, wherein the fluid manifold is flexible.

21. The fuel cell layer of claim 1, wherein the fluid manifold has multiple outlets, each outlet configured to direct a fluid out of the fluid manifold and into the enclosed region.

22. The fuel cell layer of claim 1, wherein the flexible fuel cell layer and fluid manifold are configured to deform away from one another when the fuel cells are producing electricity.

23. The fuel cell layer of claim 22, wherein the flexible fuel cell layer and fluid manifold are configured to deform away from one another by 0.5 mm.

24. The fuel cell layer of claim 22, wherein the flexible fuel cell layer and fluid manifold are configured to deform away sufficient to allow detection of the deformation by the naked eye.

25. The fuel cell layer of claim 22, wherein the flexible fuel cell layer and fluid manifold are configured to deform away from one another by millimeters.

26. The fuel cell layer of claim 1, wherein some portions of the flexible fuel cell layer are configured to deform while the fuel cells are producing electricity and some portions of the flexible fuel cell layer are configured to remain stationary while the fuel cells are producing electricity.

27. The fuel cell layer of claim 1, wherein the internal supports divide the enclosed region into a series of fluid plenums.

28. The fuel cell layer of claim 1, wherein the fluid manifold defines multiple inlets, each inlet configured to direct fuel into the fluid manifold.

29. The fuel cell layer of claim 28, wherein the fluid manifold defines multiple outlets, each outlet configured to direct fuel out of the fluid manifold and into the enclosed region.

30. The fuel cell layer of claim 1, wherein the fluid manifold further includes a fluid pressure regulator assembly configured to reduce the pressure of the fuel.

31. The fuel cell layer of claim 30, wherein the fluid pressure regulator assembly defines an array of co-planar fluid regulator devices.

* * * * *